US009565319B2

(12) United States Patent
Muto et al.

(10) Patent No.: US 9,565,319 B2
(45) Date of Patent: Feb. 7, 2017

(54) IMAGE FORMING APPARATUS HAVING AN OPTICAL SENSOR FOR CONVERTING A TONER ADHESION AMOUNT AND IMAGE FORMING METHOD

(71) Applicants: Tetsuya Muto, Tokyo (JP); Shinichi Akatsu, Kanagawa (JP); Akira Yoshida, Tokyo (JP); Keita Gotoh, Kanagawa (JP); Yuuichiroh Uematsu, Kanagawa (JP)

(72) Inventors: Tetsuya Muto, Tokyo (JP); Shinichi Akatsu, Kanagawa (JP); Akira Yoshida, Tokyo (JP); Keita Gotoh, Kanagawa (JP); Yuuichiroh Uematsu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/879,177

(22) Filed: Oct. 9, 2015

(65) Prior Publication Data
US 2016/0112580 A1    Apr. 21, 2016

(30) Foreign Application Priority Data
Oct. 17, 2014  (JP) ................................ 2014-212734

(51) Int. Cl.
*G03G 15/01*  (2006.01)
*H04N 1/00*   (2006.01)
*H04N 1/60*   (2006.01)

(52) U.S. Cl.
CPC ...... *H04N 1/00023* (2013.01); *G03G 15/0121* (2013.01); *H04N 1/00037* (2013.01);
(Continued)

(58) Field of Classification Search
CPC ............ G03G 15/0121; G03G 15/5058; G03G 15/5041
See application file for complete search history.

(56) References Cited

U.S. PATENT DOCUMENTS 5,920,748 A * 7/1999 Kawai ................ G03G 15/0853
                                                   399/59
5,970,276 A   10/1999 Kato
(Continued)

FOREIGN PATENT DOCUMENTS

JP    2004-118224    4/2004
JP    2005-077685    3/2005
(Continued)

OTHER PUBLICATIONS

U.S. Appl. No. 14/729,180, filed Jun. 3, 2015.

*Primary Examiner* — Sandra Brase
(74) *Attorney, Agent, or Firm* — Harness, Dickey & Pierce, P.L.C.

(57) ABSTRACT

An image forming apparatus includes an image bearer to bear a black toner pattern formed with a black toner image under an increased exposure amount and an increased developing bias. A first optical sensor detects an amount of reflection light reflected by the black toner pattern on the image bearer. The first optical sensor includes a light-emitting element to emit light toward the black toner pattern on the image bearer and a light-receiving element to receive the reflection light reflected by the black toner pattern on the image bearer. A toner adhesion amount converter converts the amount of the reflection light detected by the first optical sensor into a toner adhesion amount of toner adhered to the image bearer and adjusts an image density according to the toner adhesion amount.

19 Claims, 8 Drawing Sheets

(52) U.S. Cl.
CPC ............. *H04N 1/60* (2013.01); *H04N 1/6044* (2013.01); *H04N 2201/0094* (2013.01)

(56) References Cited

U.S. PATENT DOCUMENTS

| | | | | |
|---|---|---|---|---|
| 7,551,864 | B2* | 6/2009 | Fujimori | ............ G03G 15/5033 |
| | | | | 399/301 |
| 8,311,422 | B2* | 11/2012 | Hirayama | ........... G03G 15/0896 |
| | | | | 399/27 |
| 2008/0019718 | A1 | 1/2008 | Akatsu et al. | |
| 2009/0324267 | A1 | 12/2009 | Yoshida et al. | |
| 2011/0058823 | A1* | 3/2011 | Hirai | .................. G03G 15/0131 |
| | | | | 399/15 |
| 2014/0153941 | A1* | 6/2014 | Miyazaki | ........... G03G 15/0189 |
| | | | | 399/49 |
| 2014/0270827 | A1 | 9/2014 | Muto et al. | |
| 2015/0220032 | A1 | 8/2015 | Takeuchi et al. | |

FOREIGN PATENT DOCUMENTS

| | | |
|---|---|---|
| JP | 2006-284670 | 10/2006 |
| JP | 2008-026747 | 2/2008 |
| JP | 2009-109882 | 5/2009 |
| JP | 2010-008960 | 1/2010 |
| JP | 2010-039071 | 2/2010 |
| JP | 2010-091797 | 4/2010 |
| JP | 2011-150182 | 8/2011 |
| JP | 2011-154314 | 8/2011 |
| JP | 2011-170025 | 9/2011 |
| JP | 2012-181414 | 9/2012 |
| JP | 2013-092742 | 5/2013 |
| JP | 2014-115517 | 6/2014 |
| JP | 2014-119632 | 6/2014 |
| JP | 2014-178632 | 9/2014 |
| JP | 2014-186311 | 10/2014 |
| JP | 2014-222294 | 11/2014 |
| JP | 2014-240874 | 12/2014 |
| JP | 2015-068833 | 4/2015 |

* cited by examiner

IMAGE FORMING APPARATUS HAVING AN OPTICAL SENSOR FOR CONVERTING A TONER ADHESION AMOUNT AND IMAGE FORMING METHOD

CROSS-REFERENCE TO RELATED APPLICATION

This patent application is based on and claims priority pursuant to 35 U.S.C. §119 to Japanese Patent Application No. 2014-212734, filed on Oct. 17, 2014, in the Japanese Patent Office, the entire disclosure of which is hereby incorporated by reference herein.

BACKGROUND

Technical Field

Example embodiments generally relate to an image forming apparatus and an image forming method, and more particularly, to an image forming apparatus for forming a toner image on a recording medium and an image forming method performed by the image forming apparatus.

Background Art

Related-art image forming apparatuses, such as copiers, facsimile machines, printers, or multifunction printers having two or more of copying, printing, scanning, facsimile, plotter, and other functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a developing device supplies toner to the electrostatic latent image formed on the photoconductor to render the electrostatic latent image visible as a toner image; the toner image is directly transferred from the photoconductor onto a recording medium or is indirectly transferred from the photoconductor onto a recording medium via an intermediate transfer belt; finally, a fixing device applies heat and pressure to the recording medium bearing the toner image to fix the toner image on the recording medium, thus forming the image on the recording medium.

Such developing device may form the toner image with a two-component developer containing toner and carrier particles. Accordingly, the image forming apparatus may suffer from change in image density caused by change in toner density of the developer, a charging amount of toner, and the like.

SUMMARY

At least one embodiment provides a novel image forming apparatus that includes an exposure device to form an electrostatic latent image under an increased exposure amount and a developing device to visualize the electrostatic latent image as a black toner image under an increased developing bias. A rotatable image bearer bears a black toner pattern formed with the black toner image. A first optical sensor is disposed opposite the image bearer to detect an amount of reflection light reflected by the black toner pattern on the image bearer. The first optical sensor includes a light-emitting element to emit light toward the black toner pattern on the image bearer and a light-receiving element to receive the reflection light reflected by the black toner pattern on the image bearer. A toner adhesion amount converter is operatively connected to the exposure device, the developing device, and the first optical sensor to convert the amount of the reflection light detected by the first optical sensor into a toner adhesion amount of toner adhered to the image bearer and adjust an image density according to the toner adhesion amount.

At least one embodiment provides a novel image forming method that includes detecting an amount of specular reflection light reflected by a background of an image bearer; determining that the amount of the specular reflection light is not in a given range; adjusting an amount of light emitted onto the image bearer; forming a black toner patch on the image bearer with an increased amount of toner adhered to the image bearer; detecting an amount of specular reflection light reflected by the black toner patch on the image bearer; forming a plurality of toner patterns having different toner densities, respectively, on the image bearer; detecting a latent image potential of each of the plurality of toner patterns; detecting an amount of toner of each of the plurality of toner patterns adhered to the image bearer; calculating a developing potential; calculating the amount of toner of each of the plurality of toner patterns adhered to the image bearer; calculating a developing performance based on a relation between the developing potential and the calculated amount of toner adhered to the image bearer; and determining an image forming condition based on the developing performance.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

The accompanying drawings are intended to depict example embodiments and should not be interpreted to limit the scope thereof. The accompanying drawings are not to be considered as drawn to scale unless explicitly noted.

DETAILED DESCRIPTION

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a term such as "below" can encompass both an orientation of above and below. The device may be otherwise oriented (rotated 90 degrees or at other orientations) and the spatially relative descriptors used herein are interpreted accordingly.

Although the terms first, second, and the like may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present disclosure.

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Figure 1:
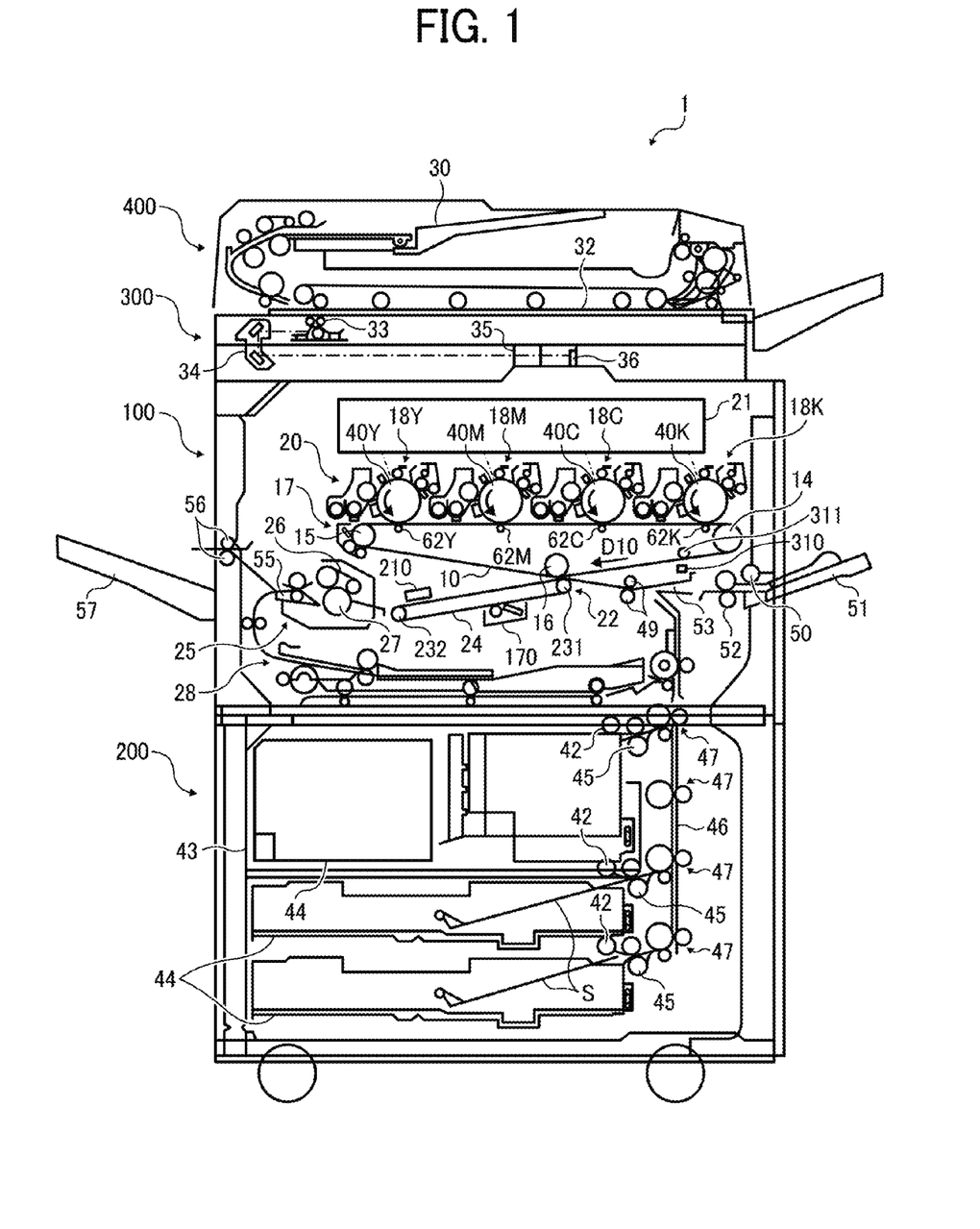
FIG. 1 is a schematic vertical sectional view of an image forming apparatus according to an example embodiment of the present disclosure.

Referring now to the drawings, wherein like reference numerals designate identical or corresponding parts throughout the several views, particularly to FIG. 1, an image forming apparatus 1 according to an example embodiment is explained.

FIG. 1 is a schematic vertical sectional view of the image forming apparatus 1. The image forming apparatus 1 may be a copier, a facsimile machine, a printer, a multifunction peripheral or a multifunction printer (MFP) having at least one of copying, printing, scanning, facsimile, and plotter functions, or the like. According to this example embodiment, the image forming apparatus 1 is a tandem color copier that forms color and monochrome toner images on recording media by electrophotography. Alternatively, the image forming apparatus 1 may be a monochrome copier that forms monochrome toner images.

With reference to FIGS. 1, 2, and 6 to 11, a description is provided of a configuration of the image forming apparatus 1 according to a first example embodiment.

With reference to FIG. 1, a description is provided of a construction of the image forming apparatus 1.

As shown in FIG. 1, the image forming apparatus 1 (e.g., a copier) includes a body 100, a sheet feeder 200 (e.g., a sheet feeding table) that mounts the body 100, a scanner 300 mounted on the body 100, and an auto document feeder (ADF) 400 mounted on the scanner 300. The image forming apparatus 1 has a tandem structure employing an intermediate transfer method.

A detailed description is now given of a construction of the body 100.

The body 100 includes an intermediate transfer belt 10 (e.g., an endless belt) serving as an intermediate transferor or an image bearer situated in a center part of the body 100.

The intermediate transfer belt 10 is looped over three support rollers, that is, a first support roller 14, a second support roller 15, and a third support roller 16, and rotatable clockwise in FIG. 1 in a rotation direction D10. The intermediate transfer belt 10 has a volume resistivity of $10^{10}$ [$\Omega cm^3$]. An opposed roller 311 is disposed opposite an optical sensor 310 via the intermediate transfer belt 10. If the volume resistivity of the intermediate transfer belt 10 is excessively low, a bias applied to the opposed roller 311 may leak, resulting in formation of a faulty toner image. Similarly, if a bias applied to a transfer roller, that is, a roller 231, leaks, the transfer roller may suffer from degradation in transfer efficiency, resulting in a decreased image density. Conversely, if the volume resistivity of the intermediate transfer belt 10 is excessively high, the image density may decrease on a toner image having a decreased image area on a recording medium or discharging may form a faulty toner image. To address this circumstance, the intermediate transfer belt 10 is applied with an appropriate volume resistivity.

The optical sensor 310 is a reflection sensor serving as a toner adhesion amount detector that optically detects an amount of toner adhered to the intermediate transfer belt 10.

On the left of the second support roller 15 is an intermediate transfer belt cleaner 17 that removes residual toner failed to be transferred onto a transfer sheet S serving as a recording medium or a transfer material and therefore remaining on the intermediate transfer belt 10 therefrom.

Four image forming devices 18Y, 18M, 18C, and 18K that form yellow, magenta, cyan, and black toner images, respectively, are arranged in the rotation direction D10 of the intermediate transfer belt 10 and disposed opposite a part of the intermediate transfer belt 10 horizontally stretched taut across the first support roller 14 and the second support roller 15. The image forming devices 18Y, 18M, 18C, and 18K constitute a tandem image forming portion 20 serving as an image forming mechanism of the image forming apparatus 1. According to this example embodiment, the third support roller 16 serves as a driving roller that drives and rotates the intermediate transfer belt 10. Above the tandem image forming portion 20 is an exposure device 21.

The tandem image forming portion 20 is disposed opposite a secondary transfer device 22 serving as a secondary transferor via the intermediate transfer belt 10. The secondary transfer device 22 includes a secondary transfer belt 24 and two rollers 231 and 232. The secondary transfer belt 24 is an endless belt serving as a sheet conveyor looped over the rollers 231 and 232. The secondary transfer belt 24 is pressed against the third support roller 16 via the intermediate transfer belt 10. The secondary transfer device 22 secondarily transfers the toner image formed on the intermediate transfer belt 10 onto the transfer sheet S.

An optical sensor 210 is disposed opposite the secondary transfer belt 24, serving as an image bearer, to detect a toner pattern formed on the secondary transfer belt 24. A secondary transfer belt cleaning unit 170 removes the toner pattern from the secondary transfer belt 24, thus cleaning the secondary transfer belt 24.

On the left of or downstream from the secondary transfer device 22 in a sheet conveyance direction is a fixing device 25 that fixes the toner image transferred from the intermediate transfer belt 10 onto the transfer sheet S thereon. The fixing device 25 includes a fixing belt 26, that is, an endless belt, which is heated by a heater and a pressure roller 27 pressed against the fixing belt 26. The secondary transfer device 22 also serves as a sheet conveyer that conveys the transfer sheet S bearing the toner image transferred from the intermediate transfer belt 10 to the fixing device 25. The secondary transfer device 22 may include a transfer roller or a non-contact transfer charger. Below and downstream from the secondary transfer device 22 and the fixing device 25 in the sheet conveyance direction is a sheet reverse device 28 extending parallel to the tandem image forming portion 20. The sheet reverse device 28 reverses the transfer sheet S to form another toner image on a back side of the transfer sheet S.

A description is provided of a copy job performed by the image forming apparatus 1.

A user places an original on an original tray 30 of the ADF 400. Alternatively, the user lifts the ADF 400, places an original on an exposure glass 32 of the scanner 300, and lowers the ADF 400 to cause the ADF 400 to press the original against the exposure glass 32. If the user places the original on the original tray 30 of the ADF 400, as the user presses a start button on a control panel, the ADF 400 conveys the original onto the exposure glass 32 and the scanner 300 is actuated. Conversely, if the user places the original on the exposure glass 32, as the user presses the start button on the control panel, the scanner 300 is actuated immediately. Accordingly, a first carriage 33 and a second carriage 34 move. A light source mounted on the first carriage 33 emits light onto the original that reflects the light toward the second carriage 34 as incident light. A mirror mounted on the second carriage 34 reflects the incident light to an image reading sensor 36 through an image forming lens 35. The image reading sensor 36 reads the light into image data.

Simultaneously with reading, a driving motor serving as a driver drives and rotates the third support roller 16 serving as a driving roller driven and rotated by the driver and thus rotating the intermediate transfer belt 10. Accordingly, the third support roller 16 rotates the intermediate transfer belt 10 clockwise in FIG. 1 in the rotation direction D10. Consequently, the first support roller 14 and the second support roller 15 are rotated by the intermediate transfer belt 10. Simultaneously, drum-shaped photoconductors 40Y, 40M, 40C, and 40K, serving as image bearers, of the image forming devices 18Y, 18M. 18C, and 18K, respectively, are driven and rotated. The exposure device 21 exposes the photoconductors 40Y, 40M, 40C, and 40K with laser beams according to yellow, magenta, cyan, and black image data created by the scanner 300 to form electrostatic latent images, respectively. The electrostatic latent images are developed into yellow, magenta, cyan, and black toner images, respectively.

Primary transfer rollers 62Y, 62M, 62C, and 62K serving as primary transfer devices, respectively, primarily transfer the yellow, magenta, cyan, and black toner images formed on the photoconductors 40Y, 40M, 40C, and 40K successively such that the yellow, magenta, cyan, and black toner images are superimposed on a same position on the intermediate transfer belt 10. Thus, a composite color toner image is formed on the intermediate transfer belt 10. Simultaneously with image formation of the tandem image forming portion 20, as one of feed rollers 42 incorporated in the sheet feeder 200 is selectively rotated to pick up and feed a transfer sheet S from one of paper trays 44 layered in a paper bank 43. A separation roller 45 separates the transfer sheet S picked up from the one of the paper trays 44 from other transfer sheets S in the paper tray 44 and feeds the transfer sheet S to a sheet conveyance path 46. A conveyance roller pair 47 conveys the transfer sheet S to a sheet conveyance path inside the body 100 where the transfer sheet S strikes a registration roller pair 49 that halts the transfer sheet S. Alternatively, a feed roller 50 rotates and feeds a transfer sheet S placed on a bypass tray 51 to a separation roller 52. The separation roller 52 separates the transfer sheet S from other transfer sheets S placed on the bypass tray 51 and conveys the transfer sheet S to a bypass conveyance path 53 where the transfer sheet S strikes the registration roller pair 49 that halts the transfer sheet S.

At a time when the composite color toner image formed on the intermediate transfer belt 10 reaches a secondary transfer nip formed between the intermediate transfer belt 10 and the secondary transfer device 22, the registration roller pair 49 resumes rotation and conveys the transfer sheet S to the secondary transfer nip. As the transfer sheet S is conveyed through the secondary transfer nip, the secondary transfer device 22 secondarily transfers the composite color toner image formed on the intermediate transfer belt 10 onto the transfer sheet S. The transfer sheet S bearing the color toner image is conveyed by the secondary transfer belt 24 to the fixing device 25 where the fixing belt 26 and the pressure roller 27 apply heat and pressure to the transfer sheet S, fixing the color toner image on the transfer sheet S. For one-sided printing, the transfer sheet S bearing the fixed toner image is directed and guided by a switch claw 55 to an output roller pair 56 that ejects the transfer sheet S onto an output tray 57 that stacks the transfer sheet S.

Conversely, for duplex printing, the transfer sheet S bearing the fixed toner image is directed and guided by the switch claw 55 to the sheet reverse device 28 that reverses and guides the transfer sheet S to the secondary transfer nip. After another toner image is secondarily transferred from the intermediate transfer belt 10 onto the back side of the transfer sheet S, the transfer sheet S is conveyed to the output roller pair 56 that ejects the transfer sheet S onto the output tray 57. After the secondary transfer of the composite color toner image, the intermediate transfer belt cleaner 17 removes residual toner failed to be transferred onto the transfer sheet S and therefore remaining on the intermediate transfer belt 10 therefrom, causing the tandem image forming portion 20 to be ready for a next image forming operation. The registration roller pair 49 is grounded. Alternatively, the registration roller pair 49 may be applied with a bias to remove paper dust from the transfer sheet S.

If the transfer sheet S is thick paper, the rotation speed of the photoconductors 40Y, 40M, 40C, and 40K, the intermediate transfer belt 10, and the like is reduced by half compared to the rotation speed for paper or a sheet other than the thick paper. When the thick paper is used as the transfer sheet S, the photoconductors 40Y, 40M, 40C, and 40K and the intermediate transfer belt 10 are driven in an order and the like identical to those when paper or a sheet other than the thick paper is used as the transfer sheet S. However, the rotation speed of the photoconductors 40Y, 40M, 40C, and 40K and the intermediate transfer belt 10 is reduced by half. Hereinafter, a half speed mode denotes a mode in which the rotation speed of the photoconductors 40Y, 40M, 40C, and 40K and the intermediate transfer belt 10 is reduced by half compared to the rotation speed for paper or a sheet other than the thick paper when the thick paper is used as the transfer sheet S.

A detailed description is now given of a construction of the image forming devices 18Y, 18M, 18C, and 18K, each of which serves as a process cartridge.

Figure 2:
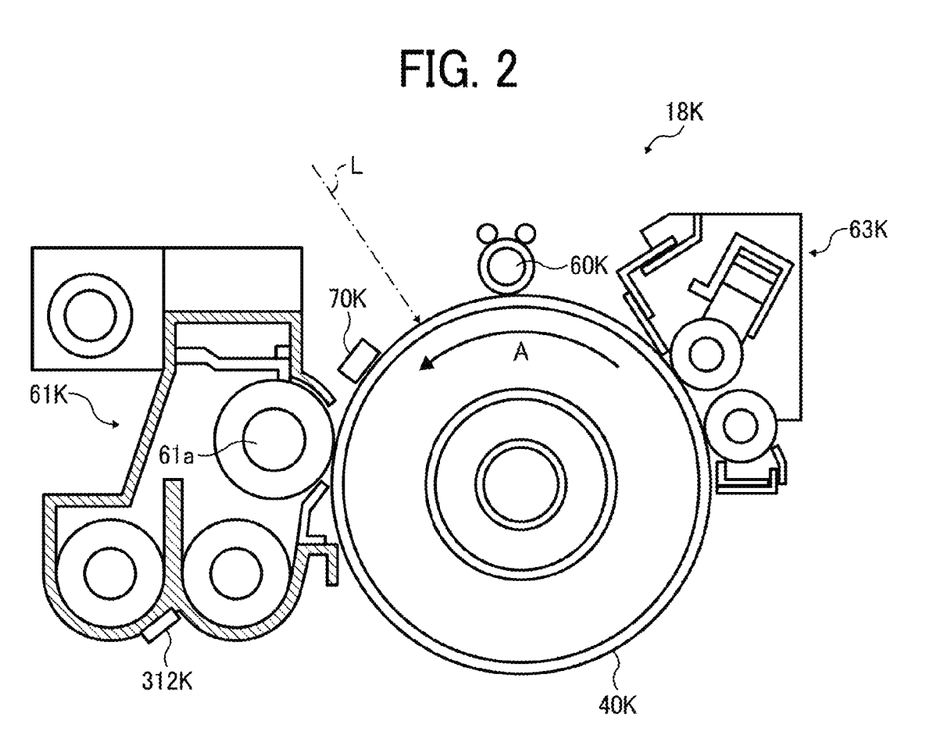
FIG. 2 is a vertical sectional view of an image forming device incorporated in the image forming apparatus shown in FIG. 1.

FIG. 2 is a vertical sectional view of the image forming device 18K. Although FIG. 2 illustrates the image forming device 18K, each of the image forming devices 18Y, 18M, and 18C has a construction similar to the construction of the image forming device 18K shown in FIG. 2.

As shown in FIG. 2, the image forming device 18K includes a charger 60K, a potential sensor 70K, a developing device 61K, a photoconductor cleaner 63K, a discharger, and the like which surround the photoconductor 40K. During an image forming operation, a driving motor drives and rotates the photoconductor 40K in a rotation direction A. After the charger 60K uniformly charges an outer circumferential surface of the photoconductor 40K, the exposure device 21 depicted in FIG. 1 emits light L onto the charged outer circumferential surface of the photoconductor 40K according to image data produced by reading an image on an original as described above, for example, thus forming an electrostatic latent image on the photoconductor 40K.

An image processor performs image processing such as color conversion processing on a color image signal produced based on image data from the scanner 300 to output yellow, magenta, cyan, and black image signals to the exposure device 21. The exposure device 21 converts the black image signal from the image processor into an optical signal based on which light L from the exposure device 21 irradiates and scans the uniformly charged outer circumferential surface of the photoconductor 40K, thus forming the electrostatic latent image on the photoconductor 40K. A developing roller 61a of the developing device 61K is applied with a developing bias to produce a developing potential, that is, a potential difference between the electrostatic latent image formed on the photoconductor 40K and the developing roller 61a. As the developing potential transfers toner on the developing roller 61a onto the electrostatic latent image formed on the photoconductor 40K, the toner visualizes the electrostatic latent image as a black toner image. A toner density sensor 312K is disposed opposite a bottom face of the developing device 61K below a developer conveyance screw situated inside the developing device 61K. The toner density sensor 312K detects the density of toner contained inside the developing device 61K as needed. The density of toner contained inside the developing device 61K is referred to as the toner density that defines an amount of toner (e.g., toner particles) with respect to an amount of carrier particles contained inside the developing device 61K.

The primary transfer roller 62K depicted in FIG. 1 primarily transfers the black toner image formed on the photoconductor 40K onto the intermediate transfer belt 10. As shown in FIG. 2, after the primary transfer of the black toner image, the photoconductor cleaner 63K removes residual toner failed to be transferred onto the intermediate transfer belt 10 and therefore remaining on the photoconductor 40K therefrom. The discharger discharges the photoconductor 40K, rendering the photoconductor 40K to be ready for a next job. Similarly, the image forming devices 18Y, 18M, and 18C include chargers, potential sensors, developing devices, photoconductor cleaners, dischargers, and the like which surround the drum-shaped photoconductors 40Y, 40M, and 40C, respectively. Yellow, magenta, and cyan toner images are formed on the photoconductors 40Y, 40M, and 40C, respectively, and primarily transferred onto the intermediate transfer belt 10 such that they are superimposed on a same position on the intermediate transfer belt 10.

A description is provided of a full color mode and a monochrome mode available in the image forming apparatus 1.

In the full color mode to form a color toner image on a transfer sheet S, the photoconductors 40Y, 40M, 40C, and 40K contact an outer circumferential surface of the intermediate transfer belt 10. In the monochrome mode to form a monochrome toner image on a transfer sheet S, the photoconductors 40Y, 40M, and 40C other than the photoconductor 40K are isolated from the outer circumferential surface of the intermediate transfer belt 10. An auto color change mode is also available in the image forming apparatus 1. The auto color change mode automatically switches between the monochrome mode and the full color mode by detecting the color of the image on the original read by the scanner 300, that is, a monochrome image or a color image.

The monochrome mode includes two modes: a first monochrome mode to form a monochrome toner image by isolating the photoconductors 40Y, 40M, and 40C from the intermediate transfer belt 10 and a second monochrome mode to form a monochrome toner image by stopping the developing devices other than the developing device 61K. The second monochrome mode is performed while the auto color change mode is selected. The user switches among the monochrome mode, the full color mode, and the auto color change mode through an input portion of a control panel disposed atop the image forming apparatus 1. The user selects a desired mode to attain advantages described below. For example, if the user wishes to render the image forming apparatus 1 to form a monochrome toner image on a transfer sheet S according to image data created by reading a color image on an original, the user selects the monochrome mode through the control panel. Thus, the user obtains the transfer sheet S bearing the desired monochrome image.

While the user selects the monochrome mode, the photoconductors 40Y, 40M, and 40C are isolated from the intermediate transfer belt 10 constantly, suppressing degradation of the photoconductors 40Y, 40M, and 40C. If the user selects the full color mode, even if an original bears a monochrome image, the image forming apparatus 1 does not switch to the monochrome mode, unlike in the auto color change mode. Accordingly, in a print job of reading a plurality of originals mixed with an original bearing a color image and an original bearing a monochrome image continuously, the full color mode forms a color toner image and a monochrome toner image on a plurality of transfer sheets S at a print speed higher than that in the auto color change mode. Consequently, if the user selects the full color mode, the user obtains the transfer sheet S bearing the color toner image and the transfer sheet S bearing the monochrome toner image quickly.

A description is provided of a configuration of a comparative image forming apparatus.

The comparative image forming apparatus may suffer from change in image density caused by change in toner density of a developer containing toner, a charging amount of toner, and the like. To address this circumstance, a given toner pattern is formed on an image bearer (e.g., a photoconductor, an intermediate transfer belt, a secondary transfer roller, a secondary transfer belt, and a sheet conveyance belt). A toner adhesion amount sensor (e.g., an optical sensor) detects the toner pattern to determine an amount of toner of the toner pattern that is adhered to the image bearer. Additionally, a toner density of the developer is detected to determine an image forming condition, a toner supply condition, and the like. Accordingly, even if a developing performance changes, a control parameter is optimized to suppress change in image density.

An amount of toner supply during printing, a charging bias of a charger, a developing bias of a developing device, an exposure amount of an exposure device, or the like is used as the control parameter. The charging bias, the developing bias, and the exposure amount are optimized by improving the developing performance through detection of the toner pattern by the toner adhesion amount sensor. The toner adhesion amount sensor optically detects the toner pattern formed on an image bearer such as the intermediate transfer belt. A toner adhesion amount, that is, an amount of toner adhered to the image bearer, is calculated based on a detection result provided by the toner adhesion amount sensor. In order to detect the toner adhesion amount with the toner adhesion amount sensor, it is necessary to form the toner pattern on the image bearer. Hence, the toner adhesion amount sensor may not detect the toner adhesion amount during printing. Further, toner is consumed to form the toner pattern.

The optical sensor for detecting the toner adhesion amount includes a light-emitting element and a light-receiving element. Several types of the optical sensor are available according to combination of the light-emitting element and the light-receiving element. For example, a reflection sensor with a combination of a light emitting diode (LED) as the light-emitting element and a photodiode (PD) or a photo transistor (PTr) as the light-receiving element is available.

Figure 3:
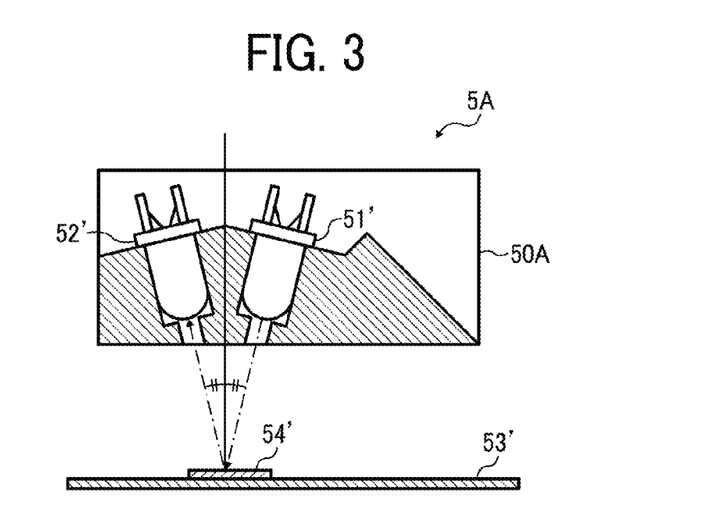
FIG. 3 is a sectional view of a first example of an optical sensor installable in the image forming apparatus shown in FIG. 1.
Figure 4:
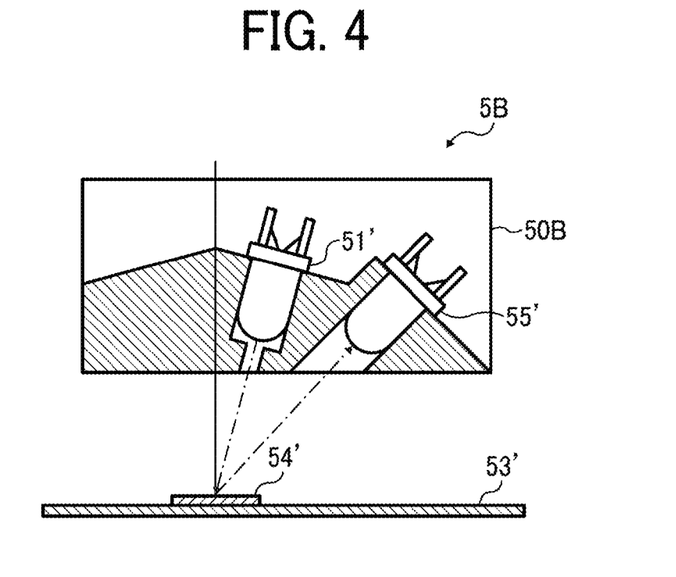
FIG. 4 is a sectional view of a second example of the optical sensor installable in the image forming apparatus shown in FIG. 1.
Figure 5:
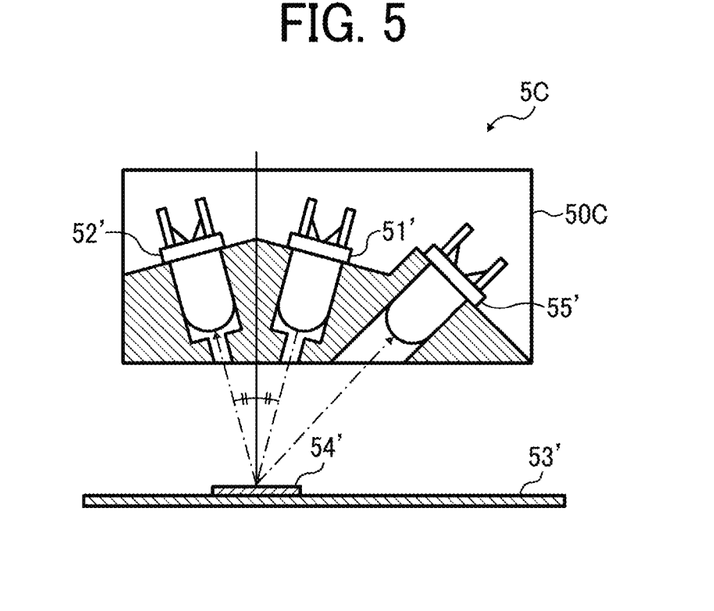
FIG. 5 is a sectional view of a third example of the optical sensor installable in the image forming apparatus shown in FIG. 1.

FIGS. 3 to 5 illustrate a plurality of reflection sensors 5A, 5B, and 5C. FIG. 3 is a sectional view of the reflection sensor 5A that detects specular reflection light only. FIG. 4 is a sectional view of the reflection sensor 5B that detects diffuse reflection light only. FIG. 5 is a sectional view of the reflection sensor 5C that detects both the specular reflection light and the diffuse reflection light. FIGS. 3 to 5 illustrate element holders 50A, 50B, and 50C, a light emitting diode (LED) 51', a specular reflection light receiving element 52' that receives the specular reflection light, a detection object face 53', a toner pattern 54' formed on the detection object face 53', and a diffuse reflection light receiving element 55' that receives the diffuse reflection light. With any one of the reflection sensors 5A, 5B, and 5C, conversion processing to convert an amount of received light that is detected by the reflection sensors 5A, 5B, and 5C into the toner adhesion amount or a value correlating with the toner adhesion amount is performed.

The conversion processing is divided into calibration of output of a sensor (e.g., the reflection sensors 5A, 5B, and 5C) and conversion into the toner adhesion amount. Several methods are available for calibration of output of the sensor. For example, a first method is to calibrate output of the sensor periodically with a white reference plate provided inside the sensor. A second method is to detect a plurality of toner patterns having different image densities, respectively, with the sensor that detects the specular reflection light and the diffuse reflection light and to conduct self calibration by internal calculation based on arrangement of outputs of the sensor.

The first method and the second method perform calibration against the diffuse reflection light. A calibration method against the specular reflection light adjusts an amount of light emitted from the light-emitting element such that output of the specular reflection light from a background adhered with no toner is a given amount of light. Conversion into the toner adhesion amount of black toner uses output of the specular reflection light only. After calibration of output of the specular reflection light, the exposure amount or the developing bias is changed. Thereafter, a plurality of toner patterns having different toner adhesion amounts, respectively, is formed and detected by the sensor.

A minimum output Vmin defines a minimum value of a sensor output Vsp obtained by detecting a black toner pattern formed with black toner. A value obtained by decreasing the minimum output Vmin from the sensor output Vsp for each of the black toner pattern and the background is used to calculate a ratio between the background and the black toner pattern and perform conversion into the toner adhesion amount. The minimum output Vmin is a value at which the sensor output Vsp from the black toner pattern is saturated.

In order to shorten a waiting time for the user, the comparative image forming apparatus is requested to reduce the number of toner patterns, for example, to about five toner patterns per color.

However, when conducting conversion into the toner adhesion amount with the specular reflection light only, conversion error may increase. An experiment shows that conversion error increases when a minimum output VminK for black toner is not detected precisely due to degradation in the developing performance. The minimum output VminK for black toner is performed to eliminate a diffuse reflection light component contributing specular reflection light output for calibration to address change in performance and position of an optical sensor caused by replacement or reinstallation of the optical sensor. Such calibration may not be performed precisely if the developing performance degrades. It is necessary to detect a toner pattern having a sufficient toner adhesion amount so as to calculate the minimum output VminK for black toner. However, it may be difficult to form the toner pattern having the sufficient toner adhesion amount.

In order to form a plurality of toner patterns having different toner adhesion amounts, respectively, the exposure amount or the developing bias may be changed. However, even if the exposure amount or the developing bias is changed, it may be impossible to form the toner pattern having the sufficient toner adhesion amount. Further, the developing performance may also degrade when a charging amount of toner increases in an environment under low temperature and humidity.

Figure 6:
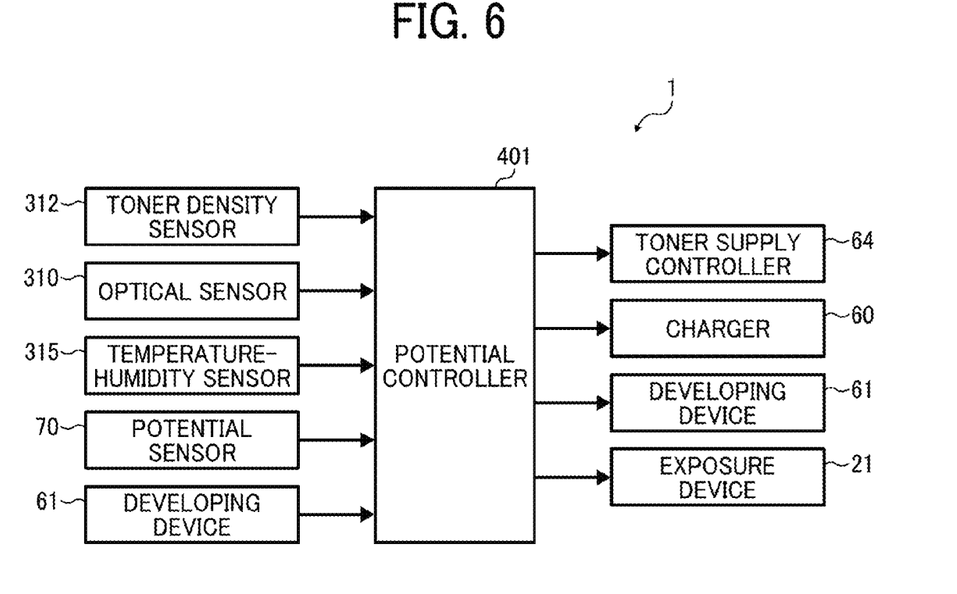
FIG. 6 is a block diagram of the image forming apparatus shown in FIG. 1 illustrating a potential controller incorporated therein.

FIG. 6 is a block diagram of the image forming apparatus 1. As shown in FIG. 6, the image forming apparatus 1 further includes a potential controller 401 as a controller to control the image density. The potential controller 401 receives information from a plurality of sensors and other components to perform precise potential control. The potential controller 401 is operatively connected to a toner density sensor 312 (e.g., the toner density sensor 312K and a toner density sensor of each of the image forming devices 18Y, 18M, and 18C), the optical sensor 310, a temperature-humidity sensor 315, a potential sensor 70, and a developing device 61 (e.g., the developing device 61K and the developing device of each of the image forming devices 18Y, 18M, and 18C). The potential controller 401 receives the light reception amount from the optical sensor 310 serving as a toner adhesion amount detector, the toner density from the toner density sensor 312, and the temperature and the humidity from the temperature-humidity sensor 315 serving as an environment sensor that detects the temperature and the humidity of an environment of the image forming apparatus 1. The potential controller 401 further receives the surface potential of the outer circumferential surface of at least one of the photoconductors 40Y, 40M, 40C, and 40K after exposure from the potential sensor 70 and the developing bias from the developing device 61.

Upon receipt of those data, the potential controller 401 outputs, as an optimum image forming condition, the charging bias to a charger 60 (e.g., the charger 60K and the charger of each of the image forming devices 18Y, 18M, and 18C), the developing bias to the developing device 61, the exposure amount (e.g., an amount of light L) to the exposure device 21, and the target control value of the toner density to a toner supply controller 64 that adjusts the toner density of toner contained inside the developing device 61. The toner supply controller 64 adjusts an amount of toner supplied to the developing device 61 based on the target control value of the toner density. Based on the optimum image forming condition, the potential controller 401 controls bias application and toner supply by the charger 60, the developing device 61, and the exposure device 21, thus retaining the image density stably.

The optical sensor 310 according to this example embodiment includes one light-emitting element and two light-receiving elements like the reflection sensor 5C shown in FIG. 5. Conversion into the toner adhesion amount is performed based on the specular reflection light only for black toner. Conversely, conversion into the toner adhesion amount is performed based on the specular reflection light and the diffuse reflection light for color toner.

Figure 7:
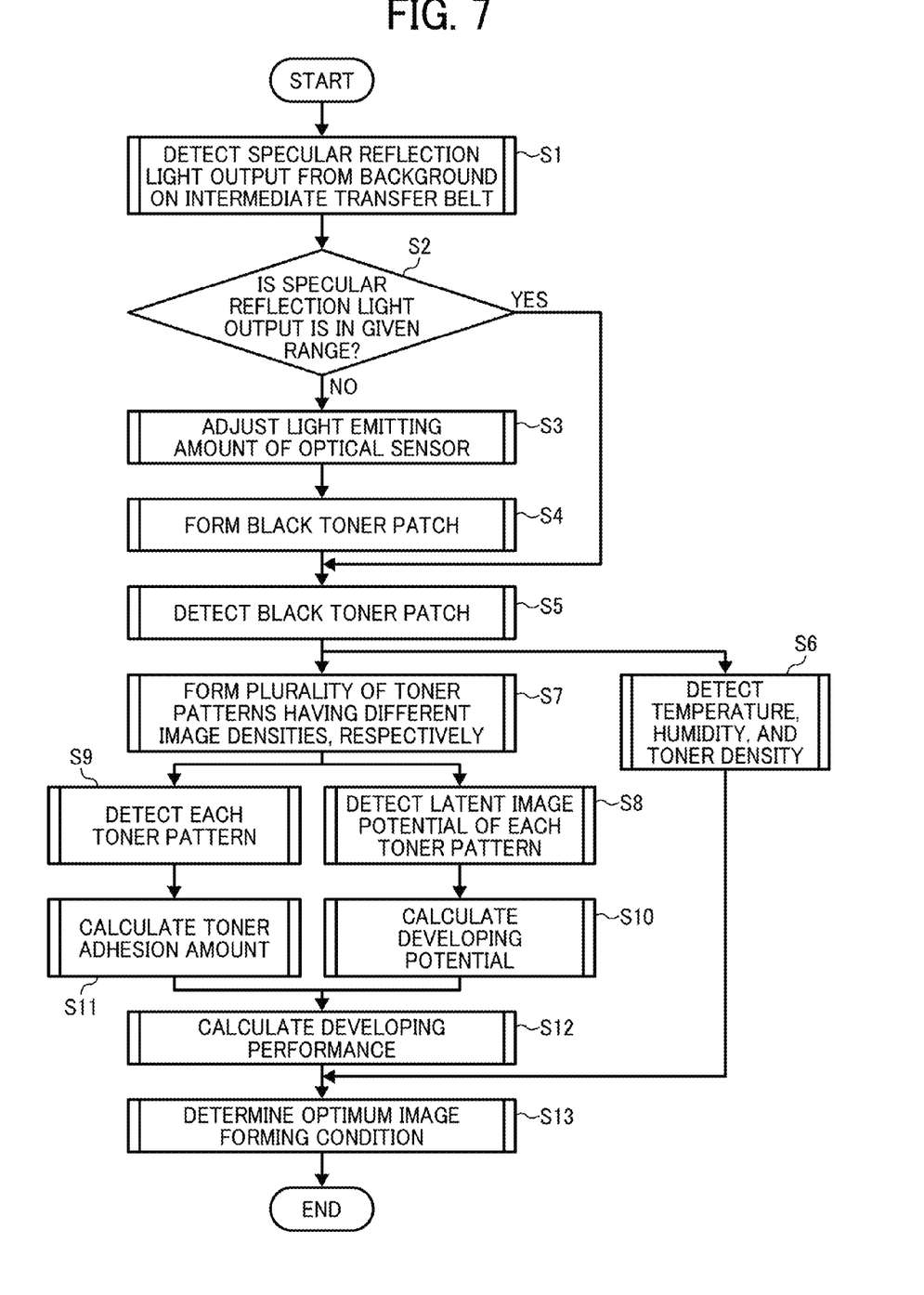
FIG. 7 is a flowchart showing control processes performed by the potential controller shown in FIG. 6.

With reference to FIG. 7, a description is provided of control processes performed by the potential controller 401.

FIG. 7 is a flowchart showing the control processes performed by the potential controller 401. The potential controller 401 performs an image density control periodically when powering on the image forming apparatus 1, after printing on transfer sheets S of a given number, for example, 250 sheets, or the like. The image density control is performed separately from printing because it is necessary to form a plurality of toner images having different image densities, respectively.

In step S1, the optical sensor 310 detects a specular reflection light output Vsg from a background on the intermediate transfer belt 10 so that the potential controller 401 determines whether or not light amount adjustment of the optical sensor 310 is necessary. In step S2, the potential controller 401 determines whether or not the specular reflection light output Vsg detected by the optical sensor 310 is in a given range. If the potential controller 401 determines that the specular reflection light output Vsg is not in the given range (NO in step S2), the potential controller 401 adjusts the light emitting amount of the optical sensor 310 in step S3. For example, the potential controller 401 adjusts the electric current value of a light-emitting diode (LED) of the optical sensor 310 so that the specular reflection light output Vsg from the background on the intermediate transfer belt 10 is in the given range of 4.0 V plus and minus 0.5 V.

Immediately after the potential controller 401 adjusts the light emitting amount of the optical sensor 310, the potential controller 401 changes the image forming condition to form a toner pattern having a sufficient toner adhesion amount. After changing the image forming condition, a black toner patch, that is, a black toner pattern, is formed in step S4. Under the changed image forming condition, the potential controller 401 sets a maximum exposure amount of the exposure device 21 and a maximum developing bias of a developing bias applicator after adjustment of the light emitting amount of the optical sensor 310. A toner pattern to be detected is also called one or more toner patches.

In step S5, the optical sensor 310 detects the single black toner patch, that is, the black toner pattern, formed under the maximum exposure amount and the maximum developing bias, obtaining a specular reflection light output VminK. If the detected specular reflection light output VminK is not smaller than a preset upper limit, the potential controller 401 does not update the specular reflection light output VminK, thus employing a previous value. The previous value defines the specular reflection light output VminK obtained in a previous control. With the previous value, even if the specular reflection light output VminK is apparently abnormal, high image quality is retained. Since the specular reflection light output VminK varies depending on the light emitting amount of the optical sensor 310, the optical sensor 310 detects the toner patch whenever the light emitting amount of the optical sensor 310 changes. When the optical sensor 310 is replaced, the specular reflection light output VminK changes. Hence, it is necessary to obtain a new specular reflection light output VminK. According to this example embodiment, the optical sensor 310 incorporates an ID chip so that the potential controller 401 determines whether or not the optical sensor 310 has been replaced when the image forming apparatus 1 is powered on, that is, when a main power switch of the image forming apparatus 1 is powered on.

When the optical sensor 310 has been replaced, the potential controller 401 presets an increased light emitting amount. Accordingly, the specular reflection light output Vsg from the background on the intermediate transfer belt 10 is outside the given range and a series of processes to automatically detect the specular reflection light output VminK is performed. Alternatively, when the ID chip itself is replaced, a series of processes to adjust the light emitting amount of the optical sensor 310 and to detect the specular reflection light output VminK may be performed to achieve similar advantages.

A description is provided of a time to detect the specular reflection light output VminK.

Detection of the specular reflection light output VminK is performed to address change in performance and position of the optical sensor 310 caused by replacement or reinstallation of the optical sensor 310, for example. Change in position of the optical sensor 310 installed in the image forming apparatus 1 influences specular reflection light substantially. Hence, detection of the specular reflection light output VminK is advantageous when converting the specular reflection light output into the toner adhesion amount. When the light emitting amount of the light-emitting element of the optical sensor 310 is changed, contribution of the diffuse reflection light changes. Accordingly, it is necessary to detect the specular reflection light output VminK. When the identical optical sensor 310 removed from the image forming apparatus 1 is reinstalled therein, a series of processes to detect the specular reflection light output VminK is performed.

Once the optical sensor 310 is installed in the image forming apparatus 1 and the light emitting amount of the light-emitting element of the optical sensor 310 is determined, it is not necessary to detect the specular reflection light output VminK repeatedly.

It is not necessary to update the specular reflection light output VminK whenever a gradation pattern is formed. Conversely, when the developing performance degrades, the toner adhesion amount may be insufficient, resulting in conversion error in the toner adhesion amount. To address this circumstance, according to this example embodiment, a time to detect the specular reflection light output VminK is restricted to improve accuracy in converting into the toner adhesion amount and at the same time reduce change in performance and position of the optical sensor 310. Adjustment of the light emitting amount of the light-emitting element of the optical sensor 310 is necessary when output of reflection light from the background on the intermediate transfer belt 10 degrades due to stain on a detection window of the optical sensor 310, stain on the intermediate transfer belt 10 serving as a detected face, and the like. In those cases, contribution of the diffuse reflection light changes. Accordingly, it is necessary to detect the specular reflection light output VminK again. For example, even if adjustment of the light emitting amount is performed, contribution of the diffuse reflection light changes as the condition of the intermediate transfer belt 10 changes. However, a threshold to determine whether or not adjustment of the light emitting amount is necessary is set properly to adjust contribution of the diffuse reflection light within an allowable range.

As shown in FIG. 7, in step S7, a plurality of toner patterns (e.g., a plurality of gradation patterns) having different image densities, respectively, is formed after obtaining the specular reflection light output VminK. In step S8, the potential sensor 70 detects a latent image potential V1 of each toner pattern. Simultaneously, the optical sensor 310 detects the toner adhesion amount of each toner pattern in step S9. After obtaining the specular reflection light output VminK, the temperature-humidity sensor 315 detects the temperature and the humidity and the toner density sensor 312 detects the toner density in step S6. In step S10, the potential controller 401 detects the latent image potential V1 of each toner pattern based on output from the potential sensor 70 and calculates a developing potential, that is, a difference between a developing bias Vb and the latent image potential V1.

According to this example embodiment, the potential controller 401 converts output of a specular reflection light-receiving element of the optical sensor 310 that receives the specular reflection light into the toner adhesion amount of black toner in step S11. In addition to output of the specular reflection light-receiving element, the potential controller 401 converts output of a diffuse reflection light-receiving element of the optical sensor 310 that receives the diffuse reflection light into the toner adhesion amount of cyan, magenta, and yellow toners in step S11. Output of the specular reflection light-receiving element for cyan, magenta, and yellow toners is used to calibrate output of the diffuse reflection light-emitting element. Conversion into the toner adhesion amount of cyan, magenta, and yellow toners is performed by general methods.

Based on a relation between the developing potential calculated in step S10 and the toner adhesion amount calculated in step S11, the potential controller 401 calculates a developing performance indicated by an inclination defined by the developing potential as X axis and the toner adhesion amount as Y axis in step S12. The potential controller 401 calculates the developing potential to attain a given image density based on the developing performance. Thus, the potential controller 401 determines the optimum image forming condition such as the developing bias, the charging bias, and the exposure amount in step S13. The temperature-humidity sensor 315 detects the temperature and the humidity and the toner density sensor 312 detects the toner density to calculate the toner density appropriate for an environment, thus determining or calibrating the target control value of the toner density.

Appropriate output ranges are preset for the detection values, respectively. The image forming apparatus 1 further includes an abnormality stopper that stops the image forming apparatus 1 when the potential controller 401 detects an abnormal detection value outside the appropriate output ranges. When the potential controller 401 detects the abnormal detection value, a notification device notifies an abnormality. Thus, the potential controller 401 performs the image density control so that the image forming apparatus 1 forms a high quality toner image.

A description is provided of conversion processes for converting output of the optical sensor 310 for black toner into the toner adhesion amount.

Figure 8:
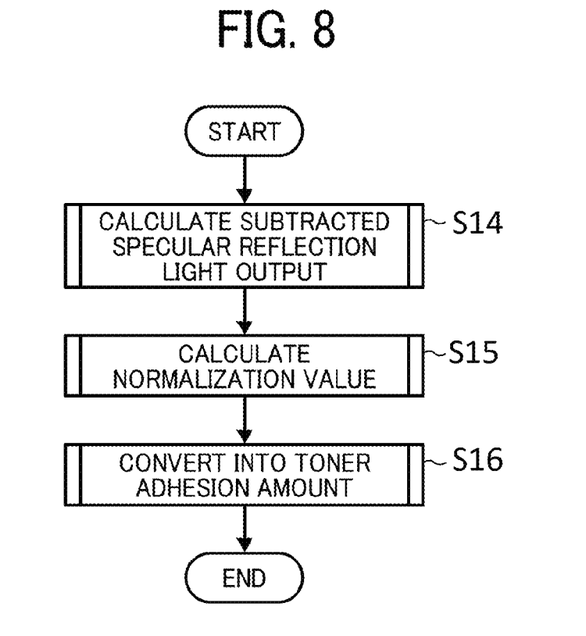
FIG. 8 is a flowchart showing conversion processes performed by the potential controller shown in FIG. 6.
Figure 9:
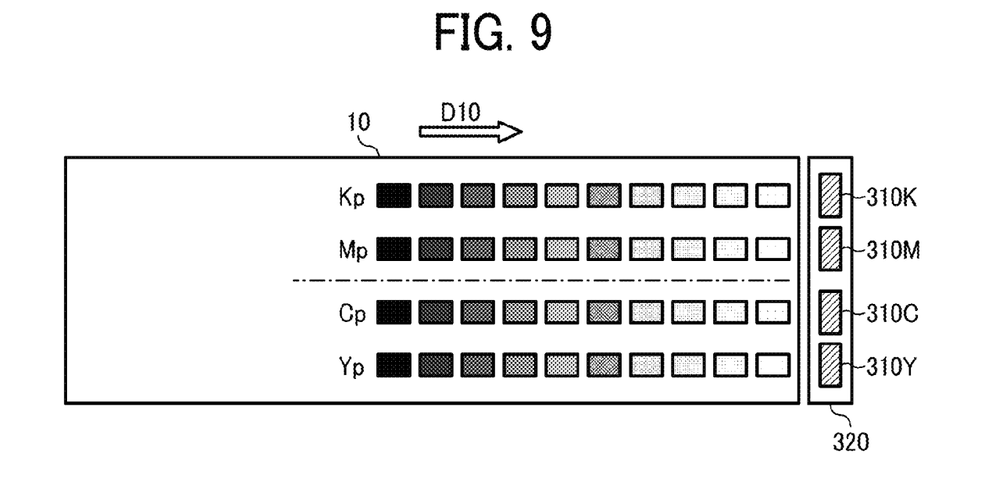
FIG. 9 is a plan view of a plurality of optical sensors incorporated in the image forming apparatus shown in FIG. 1 and a plurality of gradation patterns detected by the plurality of optical sensors.

FIG. 8 is a flowchart showing the conversion processes. FIG. 9 is a plan view of a plurality of optical sensors and a plurality of gradation patterns illustrating a relation therebetween. As shown in FIG. 9, the plurality of gradation patterns is formed under control of the potential controller 401. As shown in FIG. 9, each gradation pattern includes ten patches aligned in a sub-scanning direction and situated at ten different positions on the intermediate transfer belt 10 in the rotation direction D10 thereof. Four optical sensors, that is, optical sensors 310K, 310M, 310C, and 310Y, detect the four gradation patterns, respectively. For example, the intermediate transfer belt 10 bears a black gradation pattern Kp, a magenta gradation pattern Mp, a cyan gradation pattern Cp, and a yellow gradation pattern Yp arranged in a main scanning direction perpendicular to the rotation direction D10 of the intermediate transfer belt 10.

The optical sensors 310K, 310M, 310C, and 310Y are mounted on and supported by a sensor support plate 320 disposed opposite the outer circumferential surface of the intermediate transfer belt 10. As shown in FIG. 8, in step S14, the optical sensor 310 (e.g., the optical sensors 310K, 310M, 310C, and 310Y) detects the specular reflection light output Vsg from the toner patterns and calculates a subtracted specular reflection light output ΔVsp by subtracting an offset voltage from the specular reflection light output Vsg. In step S15, the potential controller 401 calculates a normalization value based on the specular reflection light output from the background on the intermediate transfer belt 10, the specular reflection light output from the toner patterns, and the specular reflection light output VminK from the toner patch having the sufficient toner adhesion amount. In step S16, the potential controller 401 performs conversion into the toner adhesion amount based on the calculated normalization value by referring to a preset adhesion amount conversion table.

Figure 10:
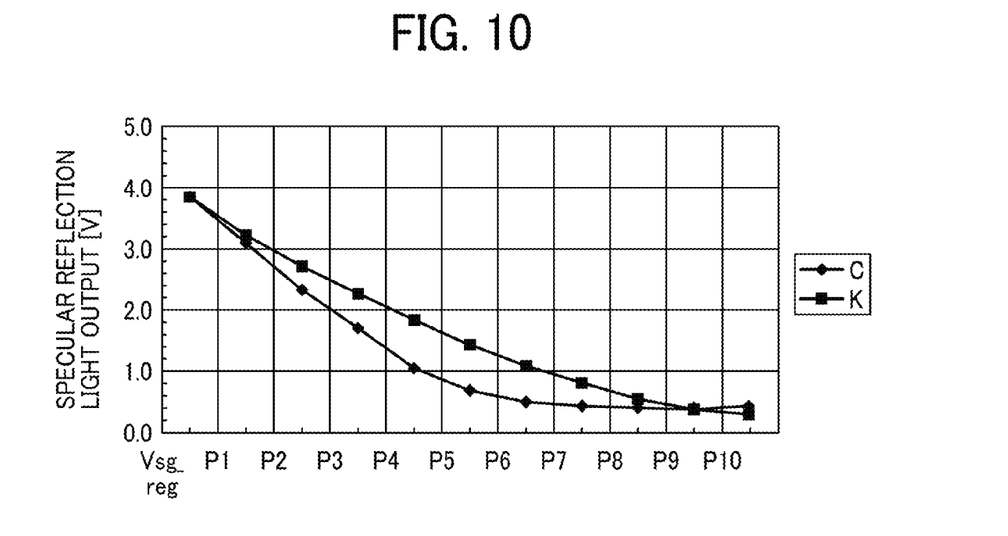
FIG. 10 is a graph showing an example of a specular reflection light output for each gradation pattern shown in FIG. 9.

For example, in step S14, the potential controller 401 calculates a specular reflection light output ΔVsg and the subtracted specular reflection light output ΔVsp by data sampling. First, the potential controller 401 calculates a difference between the specular reflection light output and the offset voltage and a difference between the diffuse reflection light output and the offset voltage at each point [n]. FIG. 10 is a graph showing an example of the specular reflection light output for each gradation pattern. Vsg_reg represents the specular reflection light output from the background on the intermediate transfer belt 10. K as a legend represents black toner. C as a legend represents cyan toner.

An increase in the specular reflection light output is calculated by a formula (1) below.

$$\Delta Vsp\_reg.[n] = Vsp\_reg.[n] - Voffset\_reg. \quad (1)$$

However, if an operational (OP) amplifier that causes each offset output voltage value (Voffset_reg: 0.0621V) when the LED is turned off to be small enough to be neglectable is used like in this example embodiment, such calculation is unnecessary.

In step S15 shown in FIG. 8, the potential controller 401 calculates the normalization value based on the specular reflection light output from the background on the intermediate transfer belt 10, the specular reflection light output from the toner patterns, and the specular reflection light output VminK from the toner patch having the sufficient toner adhesion amount. Vsg_reg represents the specular reflection light output from the background on the intermediate transfer belt 10. VminK is a value obtained by detecting the toner patch having an increased toner adhesion amount with the optical sensor 310. The normalization value is calculated by a formula (2) below.

$$N = (\Delta Vsp\_reg.[n] - VminK)/(Vseg\_reg. - VminK) \quad (2)$$

In the formula (2), N represents the normalization value.

In step S16, if a relation between the normalization value and the toner adhesion amount is preset experimentally, the relation allows precise conversion into the toner adhesion amount even for an increased adhesion amount region of the toner patch by referring to an inverse conversion table or a conversion table.

Figure 11:
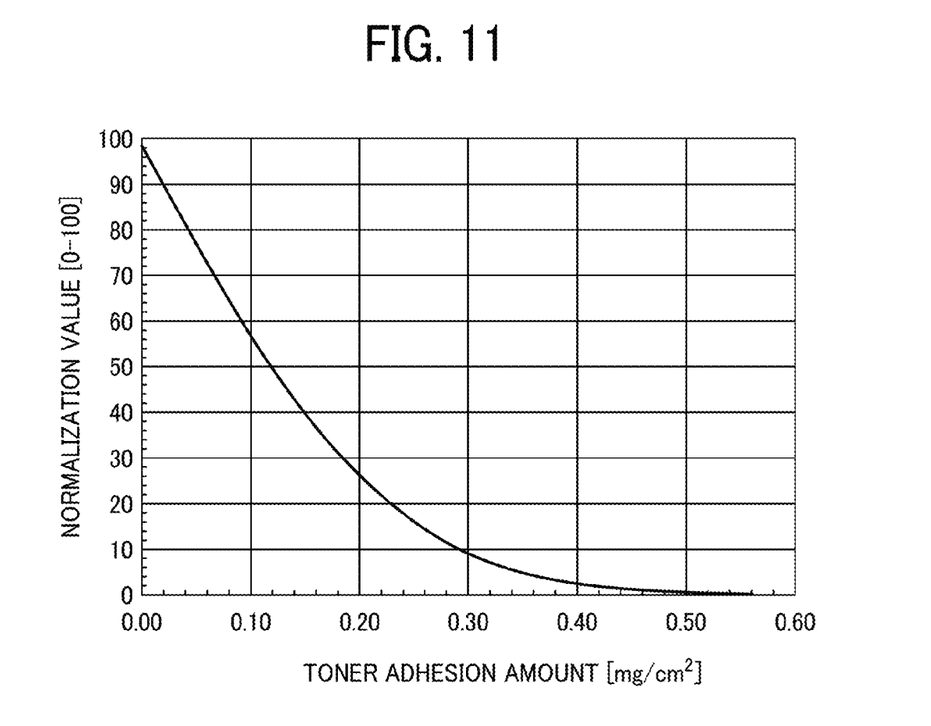
FIG. 11 is a graph showing a conversion table used by the potential controller shown in FIG. 6.

FIG. 11 is a graph showing a conversion table for the toner adhesion amount according to this example embodiment. The potential controller 401 converts the normalization value into the toner adhesion amount by referring to the conversion table defining a relation between the toner adhesion amount and the normalization value.

The potential controller 401 performs conversion into the toner adhesion amount precisely through the conversion processes described above, even if the developing performance degrades, the light emitting amount of the optical sensor 310 changes, the optical sensor 310 is replaced, or the optical sensor 310 is reinstalled. For example, even if the developing performance degrades or the like, output from the black toner patch having the sufficient toner adhesion amount is used for conversion into the toner adhesion amount. Accordingly, the potential controller 401 reduces adverse effect caused by replacement and reinstallation of the optical sensor 310 and performs precise conversion into the toner adhesion amount to form a high quality toner image. When the light emitting amount of the optical sensor 310 is changed or the like, output from the black toner patch having the increased toner adhesion amount changes. To address this circumstance, the potential controller 401 detects the specular reflection light output VminK again, thus forming a high quality toner image effectively. If the optical sensor 310 includes a plurality of sensors (e.g., the optical sensors 310K, 310M, 310C, and 310Y), the specular reflection light output VminK is detected by each of the plurality of sensors.

A description is provided of a configuration of the image forming apparatus 1 according to a second example embodiment.

Figure 12:
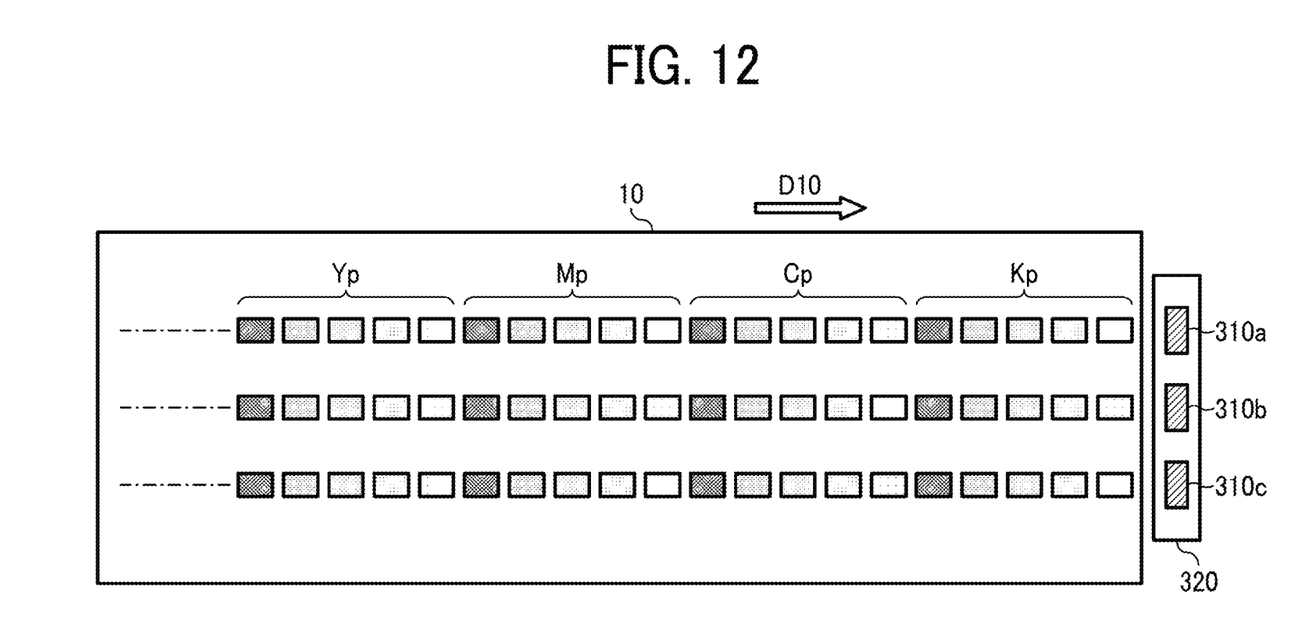
FIG. 12 is a plan view of a plurality of optical sensors installable in the image forming apparatus shown in FIG. 1 and a plurality of gradation patterns detected by the plurality of optical sensors.

FIG. 12 is a plan view of a plurality of optical sensors and a plurality of gradation patterns illustrating a relation therebetween. The identical reference numerals are assigned to components identical to the components according to the first example embodiment described above and a description of a construction and a configuration of those components is omitted. The image forming apparatus 1 according to the second example embodiment is different from the image forming apparatus 1 according to the first example embodiment in the number of the optical sensors and the gradation patterns formed under control by the potential controller 401. The potential controller 401 forms a plurality of toner pattern rows (e.g., three rows according to this example embodiment). Each toner pattern row includes the black gradation pattern Kp, the cyan gradation pattern Cp, the magenta gradation pattern Mp, and the yellow gradation pattern Yp contiguously aligned in the rotation direction D10 of the intermediate transfer belt 10. Each of the black gradation pattern Kp, the cyan gradation pattern Cp, the magenta gradation pattern Mp, and the yellow gradation pattern Yp has five patches in five graded colors. The optical sensor 310 of the image forming apparatus 1 according to the second example embodiment includes three optical sensors, that is, a front optical sensor 310a, a center optical sensor 310b, and a rear optical sensor 310c, which detect the toner patterns formed by the potential controller 401.

Even being compared to the black gradation pattern Kp, the cyan gradation pattern Cp, the magenta gradation pattern Mp, and the yellow gradation pattern Yp according to the first example embodiment shown in FIG. 9 that have ten graded colors, the black gradation pattern Kp, the cyan gradation pattern Cp, the magenta gradation pattern Mp, and the yellow gradation pattern Yp according to the second example embodiment shown in FIG. 12 that have five graded colors take time from formation until detection thereof that is equivalent to time taken in the first example embodiment. Additionally, each of the front optical sensor 310a, the center optical sensor 310b, and the rear optical sensor 310c detects the black gradation pattern Kp, the cyan gradation pattern Cp, the magenta gradation pattern Mp, and the yellow gradation pattern Yp, each of which has the five graded colors to obtain variation in image density in the main scanning direction perpendicular to the rotation direction D10 of the intermediate transfer belt 10. Accordingly, the potential controller 401 determines an image forming condition that offsets variation in image density in general methods. For example, like the optical sensor 5A depicted in FIG. 3, each of the front optical sensor 310a, the center optical sensor 310b, and the rear optical sensor 310c includes a single light-emitting element and a single light-receiving element. The light-receiving element is situated at a position to receive a specular reflection light component.

According to the second example embodiment, detection of the specular reflection light output VminK is performed by each of the front optical sensor 310a, the center optical sensor 310b, and the rear optical sensor 310c. Additionally, the potential controller 401 detects the toner adhesion amount of color toner by conversion of the specular reflection light output only. The potential controller 401 performs conversion processes identical to the conversion processes for the toner adhesion amount of black toner according to the first example embodiment. The conversion processes used for the toner adhesion amount of black toner are also used for the toner adhesion amount of color toner by forming a toner patch having the sufficient toner adhesion amount and detecting the toner patch, thus attaining advantages equivalent to those attained in the first example embodiment. Thus, the potential controller 401 performs conversion into the toner adhesion amount without error even when detecting the toner adhesion amount of black toner for a plurality of times or when converting into the toner adhesion amount of color toner based on the specular reflection light output only.

The present disclosure is not limited to the details of the example embodiments described above and various modifications and improvements are possible. The advantages achieved by the image forming apparatus 1 are not limited to those described above.

For example, according to the example embodiments described above, the intermediate transfer belt 10 serves as an image bearer. Alternatively, the photoconductors 40Y, 40M, 40C, and 40K and the secondary transfer belt 24 may serve as an image bearer. If at least one of the photoconductors 40Y, 40M, 40C, and 40K serves as an image bearer, the optical sensor 310 is disposed opposite the at least one of the photoconductors 40Y, 40M, 40C, and 40K. If the secondary transfer belt 24 serves as an image bearer, the optical sensor 210 detects a toner pattern formed on the secondary transfer belt 24.

As shown in FIGS. 1 and 2, the image forming apparatus 1 includes a rotatable image bearer (e.g., the photoconductors 40Y, 40M, 40C, and 40K, the intermediate transfer belt 10, and the secondary transfer belt 24); an exposure device (e.g., the exposure device 21) to form an electrostatic latent image according to image data under an increased exposure amount (e.g., a maximum exposure amount); and a developing device (e.g., the developing device 61K) to visualize the electrostatic latent image as a black toner image under an increased developing bias (e.g., a maximum developing bias) as a black toner pattern borne by the image bearer. The image forming apparatus 1 further includes a toner adhesion amount detector (e.g., the optical sensor 310), disposed opposite the image bearer, including a light-emitting element and a light-receiving element to optically detect an amount of reflection light from the black toner pattern on the image bearer; and a toner adhesion amount converter (e.g., the potential controller 401), operatively connected to the toner adhesion amount detector, to convert the amount of the reflection light detected by the toner adhesion amount detector into a toner adhesion amount and adjust an image density according to the toner adhesion amount. The toner adhesion amount converter calculates the toner adhesion amount based on the amount of the reflection light from the black toner pattern that is detected by the toner adhesion amount detector.

Accordingly, the potential controller performs conversion into the toner adhesion amount by using the specular reflection light output from the toner adhesion amount detector precisely regardless of change in performance and position of the toner adhesion amount detector caused by replacement and reinstallation thereof and change in developing performance of the image forming apparatus 1, resulting in formation of a high quality toner image by the image forming apparatus 1.

The present disclosure has been described above with reference to specific example embodiments. Note that the present disclosure is not limited to the details of the embodiments described above, but various modifications and enhancements are possible without departing from the spirit and scope of the disclosure. It is therefore to be understood that the present disclosure may be practiced otherwise than as specifically described herein. For example, elements and/or features of different illustrative example embodiments may be combined with each other and/or substituted for each other within the scope of the present disclosure.

What is claimed is:

1. An image forming apparatus, comprising:
an exposure device configured to form an electrostatic latent image under an increased exposure amount;
a developing device configured to visualize the electrostatic latent image as a black toner image under an increased developing bias;
a rotatable image bearer configured to bear a black toner pattern formed with the black toner image;
an optical sensor, opposite the image bearer, configured to detect an amount of reflection light reflected by the black toner pattern on the image bearer,
the optical sensor including:
a light-emitting element configured to emit light toward the black toner pattern on the image bearer; and
a light-receiving element configured to receive the reflection light reflected by the black toner pattern on the image bearer; and
a toner adhesion amount converter, operatively connected to the exposure device, the developing device, and the optical sensor, configured to convert the amount of the reflection light detected by the optical sensor into a toner adhesion amount of toner adhered to the image bearer and adjust an image density according to the toner adhesion amount,
wherein the toner adhesion amount is calibrated based on at least one of a result of the optical sensor with a white reference plate provided inside the optical sensor and a plurality of toner patterns having different image densities, respectively, with the optical sensor that detects a specular reflection light and a diffuse reflection light.

2. The image forming apparatus according to claim 1, wherein the exposure device and the developing device form the black toner pattern at least at one of a time when the light-emitting element of the optical sensor changes a light-emitting amount, a time when the optical sensor is replaced, and a time when the optical sensor is reinstalled.

3. The image forming apparatus according to claim 1, further comprising another optical sensor, opposite the image bearer, configured to optically detect the amount of the reflection light reflected by the black toner pattern on the image bearer, the another optical sensor including:
a light-emitting element configured to emit light; and
a light-receiving element configured to receive the reflection light reflected by the black toner pattern on the image bearer.

4. The image forming apparatus according to claim 3, wherein the exposure device and the developing device form the black toner pattern at least at one of a time when the light-emitting element of at least one of the optical sensor and the another optical sensor changes a light-emitting amount, a time when at least one of the optical sensor and the another optical sensor is replaced, and a time when at least one of the optical sensor and the another optical sensor is reinstalled.

5. The image forming apparatus according to claim 3, wherein the exposure device and the developing device are configured to form a color toner image to be formed into a color toner pattern borne on the image bearer, wherein the optical sensor configured to detect an amount of reflection light reflected by the color toner pattern on the image bearer, and wherein the toner adhesion amount converter configured to convert the amount of the reflection light detected by the optical sensor into a toner adhesion amount of toner adhered to the image bearer and configured to adjust an image density according to the toner adhesion amount.

6. The image forming apparatus according to claim 5, wherein the color toner pattern includes:
   a first gradation pattern constructed of a plurality of graded color patches in a first color that is aligned in a rotation direction of the image bearer; and
   a second gradation pattern constructed of a plurality of graded color patches in a second color that is aligned in the rotation direction of the image bearer.

7. The image forming apparatus according to claim 6, wherein the first gradation pattern is aligned with the second gradation pattern in a main scanning direction perpendicular to the rotation direction of the image bearer.

8. The image forming apparatus according to claim 7, wherein the optical sensor is configured to detect the first gradation pattern and the another optical sensor is configured to detect the second gradation pattern.

9. The image forming apparatus according to claim 6,
   wherein the first gradation pattern is contiguous to the second gradation pattern in the rotation direction of the image bearer, and
   wherein the optical sensor is configured to detect the first gradation pattern and the second gradation pattern.

10. The image forming apparatus according to claim 9, wherein the color toner pattern further includes another first gradation pattern and another second gradation pattern contiguous to the another first gradation pattern in the rotation direction of the image bearer, and
    wherein the another optical sensor is configured to detect the another first gradation pattern and the another second gradation pattern.

11. The image forming apparatus according to claim 1, wherein the light-receiving element of the optical sensor includes a specular reflection light-receiving element configured to receive specular reflection light, and
    wherein the toner adhesion amount converter is configured to convert an amount of the specular reflection light into the toner adhesion amount.

12. The image forming apparatus according to claim 1, wherein when the amount of the reflection light is greater than a preset upper limit, the toner adhesion amount converter uses the amount of the reflection light detected by the optical sensor previously.

13. The image forming apparatus according to claim 1, wherein the image bearer includes one of an intermediate transfer belt and a secondary transfer belt.

14. The image forming apparatus according to claim 1, wherein the toner adhesion amount converter includes a potential controller.

15. The image forming apparatus according to claim 14, further comprising a temperature-humidity sensor, operatively connected to the potential controller, configured to detect a temperature and a humidity of an environment of the image forming apparatus.

16. The image forming apparatus according to claim 14, further comprising a toner density sensor, operatively connected to the potential controller, configured to detect a toner density of toner contained in the developing device.

17. The image forming apparatus according to claim 14, wherein the image bearer includes a photoconductor.

18. The image forming apparatus according to claim 17, further comprising a potential sensor, operatively connected to the potential controller, to detect a potential of an outer circumferential surface of the photoconductor after exposure by the exposure device.

19. An image forming method comprising:
    detecting an amount of specular reflection light reflected by a background of an image bearer;
    determining that the amount of the specular reflection light is not in a given range;
    adjusting an amount of light emitted onto the image bearer;
    forming a black toner patch on the image bearer with an increased amount of toner adhered to the image bearer;
    detecting an amount of specular reflection light reflected by the black toner patch on the image bearer;
    forming a plurality of toner patterns having different toner densities, respectively, on the image bearer;
    detecting a latent image potential of each of the plurality of toner patterns;
    detecting an amount of toner of each of the plurality of toner patterns adhered to the image bearer;
    calculating a developing potential;
    calculating the amount of toner of each of the plurality of toner patterns adhered to the image bearer;
    calculating a developing performance based on a relation between the developing potential and the calculated amount of toner adhered to the image bearer; and
    determining an image forming condition based on the developing performance.

* * * * *